United States Patent [19]
McBride et al.

[11] Patent Number: 6,092,323
[45] Date of Patent: Jul. 25, 2000

[54] DUCK DECOY

[76] Inventors: Craig M. McBride, 151 Pintail Ct., Yuba City, Calif. 95993; Thomas L. Meeker, 651 Southgate Rd., Sacramento, Calif. 95815

[21] Appl. No.: 09/309,557

[22] Filed: May 12, 1999

[51] Int. Cl.$^7$ ................................................. A01M 31/06
[52] U.S. Cl. ........................................................... 43/3
[58] Field of Search .................................... 43/2, 3

[56] References Cited

U.S. PATENT DOCUMENTS

| | | |
|---|---|---|
| 740,293 | 9/1903 | Loeble .......................................... 43/3 |
| 2,051,221 | 8/1936 | Noddings . |
| 2,480,390 | 8/1949 | Thompson ................................... 43/3 |
| 2,704,908 | 3/1955 | Lamkin . |
| 2,849,823 | 9/1958 | Miller . |
| 3,689,927 | 9/1972 | Boston . |
| 4,620,385 | 11/1986 | Carranza et al. . |
| 4,845,873 | 7/1989 | Hazlett . |
| 4,893,428 | 1/1990 | Gagnon, Sr. . |
| 4,896,448 | 1/1990 | Jackson . |
| 5,377,439 | 1/1995 | Roos et al. . |
| 5,809,683 | 9/1998 | Solomon . |
| 5,862,619 | 1/1999 | Stancil . |
| 5,930,936 | 8/1999 | Parr .............................................. 43/3 |

FOREIGN PATENT DOCUMENTS

| | | |
|---|---|---|
| 712760 | 7/1965 | Canada . |
| 775308 | 1/1968 | Canada . |
| 383031 | 11/1932 | United Kingdom . |

*Primary Examiner*—Jack W. Lavinder
*Attorney, Agent, or Firm*—Richard C. Litman

[57] ABSTRACT

A fowl decoy for use by duck hunters. More specifically, the invention is a model duck having motorized wings which provide the decoy with the appearance of a duck in perpetual stationary flight above a water body. The duck body is mounted on a control platform. The platform is supported by the middle fork of a pitch fork-shaped frame. A pair of plates is welded to each end of a horizontal shaft, extending from the left and right side of the duck body. The shaft is supported at its opposite ends by the two outside forks of the frame, and is connected to a motor housed inside the duck body. Each plate-shaped wing has a major surface that is white, and a major surface that is dark brown such that rotation of the plates simulates a duck flapping its wings. The shaft is free spinning while the motor is off so that the shaft and plates may spin due to wind forces. Wind-induced spinning of the plates is facilitated by a wing flap along the outer edge of each plate. The motor is preferably of variable speed, direct current, and preferably powered by a six volt lantern battery. It may also be powered by a 12 volt rechargeable battery. A substantially vertical stand having a foot peg and sharpened base supports the frame. Using the foot peg, the base is driven into the mud in a shallow area, such that the duck decoy flies conspicuously above the water.

12 Claims, 6 Drawing Sheets

DUCK DECOY

BACKGROUND OF THE INVENTION

1. Field of the Invention

The present invention relates to water fowl decoys, and more particularly, to a frame for a duck having motor-powered and wind-actuated wings that visually simulate an actual duck in flight.

2. Description of the Related Art

The concept of using water fowl decoys to attract game to a particular hunting area is well known in the hunting art. In fact, the concept of fowl decoys having moving wings is known and used. Such decoys are generally made of wood or molded plastic and are placed in water to mimic the appearance of a duck or goose. Some conventional decoys of this nature employ mechanically driven wings, to imitate the flapping of wings in a water body. To date, no one has made a fowl decoy with two pairs of rotating wings and placed it upon a frame containing a stake for insertion into the ground such that the fowl appears to be in stationary, suspended flight.

The motorized fowl decoys in the prior art generally lack the platform, frame, and stand of the present invention. Such prior art decoys are typically designed to float on the surface of the water, where they are subject to being caught in brambles, sticks, and other potential obstructions. The present invention operates independently of the water.

Motion and, in particular, wing motion, is the single most important factor in the design of decoys for duck hunting. For example, one of the peculiarities of real ducks is the dark brown back side of the wings in contrast to the white underside of the wings, evident as an intermittenmt flashing when the duck is seen flying from a distance. Although the light/dark wing feature is known, the prior art fails to adequately isolate the wing motion of a duck. The present invention uses a structural frame and stand to isolate wing motion on a stable platform, and to provide a decoy which operates independent of the water medium.

U.S. Pat. No. 4,620,385 issued November 1986 to Carranza et al is a water fowl decoy with "spinning" wings. The Carranza et al device is unmotorized, rests in the water rather than in the air, and lacks a frame, stand and ground stake. Carranza et al do not suggest the present device or assembly as claimed. U.S. Pat. No. 5,809,683 issued September 1998 to Solomon is a battery operated waterfowl decoy having non-spinning wings and no stand. Solomon does not suggest the present device or assembly as claimed. U.S. Pat. No. 4,893,428 issued September 1990 to Gagnon, Sr. is a waterfowl decoy that tacks in the wind. Gagnon, Sr. does not suggest the present device or assembly as claimed. U.S. Pat. No. 5,862,619 issued January 1999 to Stancil is a single wing assembly and frame on the back of a waterfowl decoy. The Stancil device does not suggest a stand or ground stake. Moreover, the Stancil single-wing assembly lacks the dual-winged realism of the present device. Stancil does not suggest the present device or assembly as claimed. U.S. Pat. No. 2,704,908 issued March 1955 to Lamkin is an artificial bird having "flapping" wings. Lamkin does not suggest the present device or assembly as claimed. U.S. Pat. No. 2,849,823 issued September 1958 to Miller is a motorized fowl decoy on a "float," having non-spinning wings. Miller does not suggest the present device or assembly as claimed. U.S. Pat. No. 4,896,448 issued January 1990 to Jackson is a bird decoy having "flapping wings." Jackson does not suggest the present invention as claimed. U.S. Pat. No. 3,689,927 issued September 1972 to Boston is a motor-powered radio-controlled decoy having a rudder. Boston does not suggest the present invention as claimed. U.S. Pat. No. 4,845,873 issued July 1989 to Hazlett is an animal decoy having a movable appendage. Hazlett does not suggest the present invention as claimed. U.S. Pat. No. 5,377,439 issued January 1995 to Roos et al is a remote controlled decoy having a moving head. Roos et al do not suggest the present device or assembly as claimed. Great Britain Pat. No. 383,031 issued to Mieville, having a publication date of November 1932, is a mechanical bird decoy having wings that move up and down. Mieville does not suggest the present device or assembly as claimed. Canadian Pat. No. 712,760 issued July 1965 to Speers is a bird decoy made from automobile tires. Speers does not suggest the present device or assembly as claimed. Finally, Canadian Pat. No. 775,308 issued January 1968 to Lajeunesse is a duck decoy made with a plastic bottle. Lajeunesse does not suggest the present device or assembly as claimed.

The prior art does not disclose the combination of features evident in the present decoy. None of the above inventions and patents, taken either singularly or in combination, is seen to describe the instant invention as claimed. Thus, a duck decoy solving the aforementioned problems is desired.

SUMMARY OF THE INVENTION

This invention relates generally to bird decoys for use by duck hunters. More specifically, the invention is a model duck mounted on a platform and having motorized "wings" supported by a goal post-shaped, or pitch fork-shaped, frame. A motor mounted on the platform drives a pair of wing-mimicking, rotatable plates attached to either end of a horizontal shaft extending from the duck body. Each plate-shaped wing has a major surface that is white, and a major surface that is dark brown to simulate a duck flapping its wings.

The shaft has a free spinning mode such that the shaft and plates may spin due to wind forces, even while the motor is off. Free spinning of the plates is facilitated by an aerodynamic wing flap along each wing's two outer edges, furthest from the shaft. The motor is preferably of variable speed, direct current, and preferably powered by a six volt lantern battery. It may also be powered by a 12 volt rechargeable battery.

The frame is supported by a stand. The stand has a solid, cylindrical, sharpened stake portion extending from its bottom. The stake is placed into the mud in a shallow area, and driven into the mud by standing upon a ⅜" smooth-rod foot peg supported on the stand by a ⅛" gusset.

Accordingly, it is a principal object of the invention to provide a realistic duck decoy that effectively attracts other ducks to the vicinity.

It is another object of the invention to provide a duck decoy platfom, frame, and stand to support, stabilize, and anchor the duck decoy, such that it maintains the appearance of maintaining stationary air flight.

Another object of the invention is to provide a motorized wing motion that simulates the flashing of a duck's white underwings, and where the "wings" freely rotate on the shaft, even if the motor is not running.

Yet another object of the invention is to provide aerodynamic wing flaps to facilitate wind-actuated wing motion, and to simulate suspended stationary air flight.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a motorized fowl decoy device and assembly having free-spinning, flashing, aerodynamic wings, mounted on a frame and stand such that the "duck" decoy appears to be in suspended, stationary flight.

Figure 1:
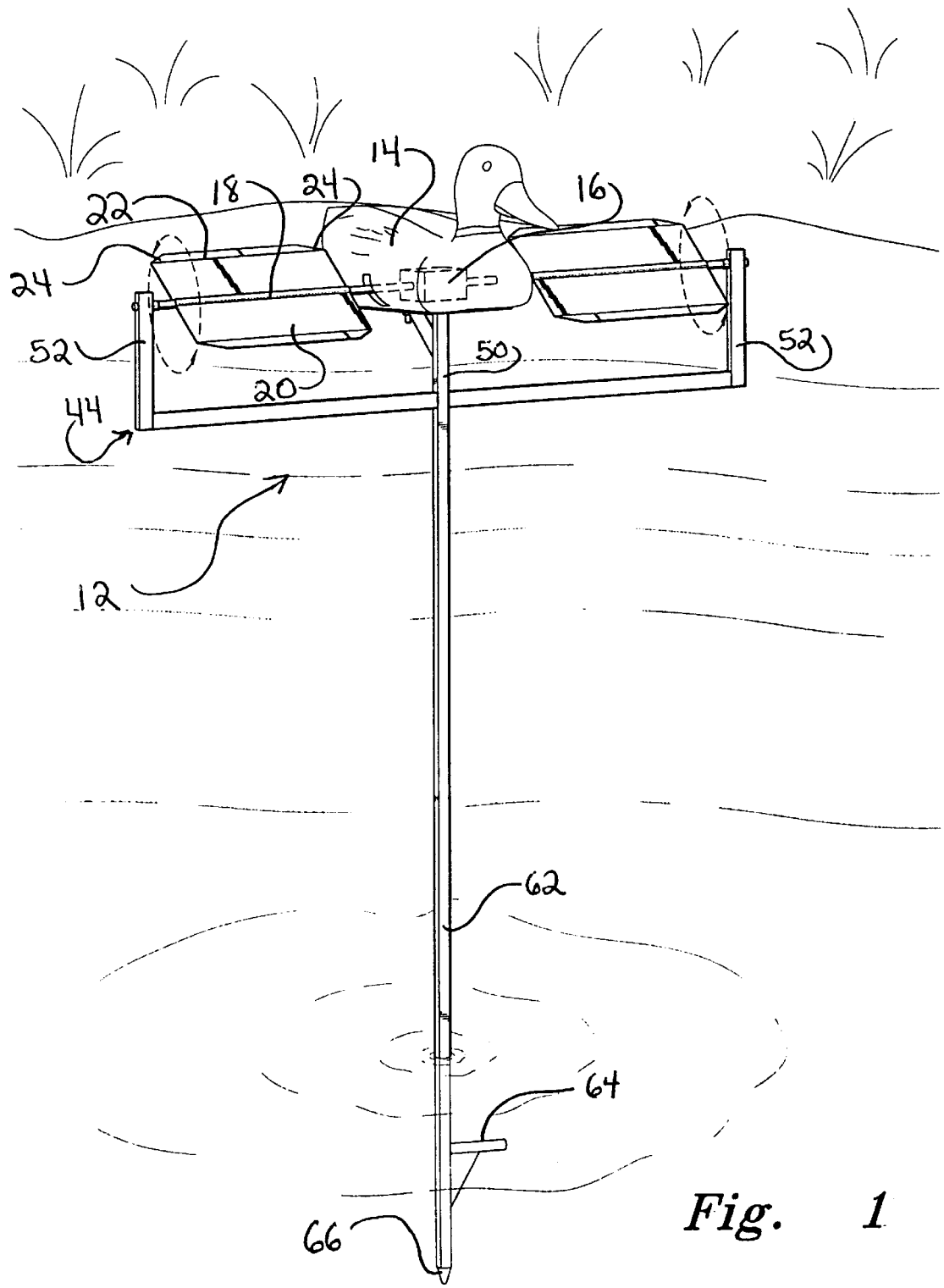
FIG. 1 is an environmental perspective of duck decoy in operation, showing steel frame and wings, stand, foot peg, and ground stake.
Figure 2:
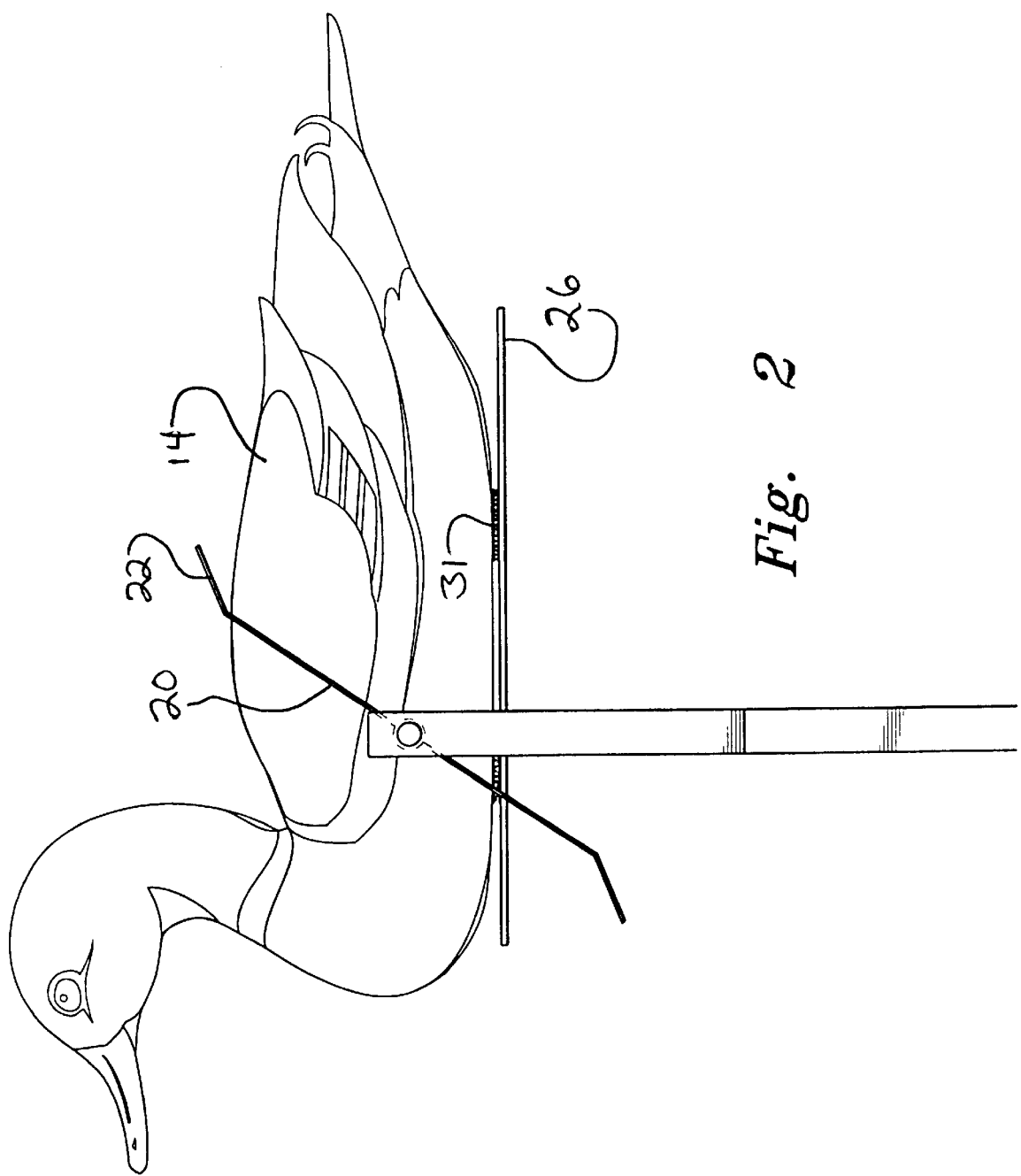
FIG. 2 is a side view of decoy body, showing an outside fork of the frame, a profile of a pair of metal-plate wings, and a support platform.

FIG. 1 is a perspective view of the preferred fowl decoy 12 embodiment, including a rigid duck-shaped decoy body 14 housing a variable speed motor 16 connected to a shaft 18.

Decoy body 14 is preferably made from hard plastic, but may also be made from treated styrofoam or other suitable strong, yet light weight material. Shaft 18 protrudes an equal distance through each of two opposite sides of body 14. Shaft 18 is free-spinning when the motor is turned off.

Figure 3:
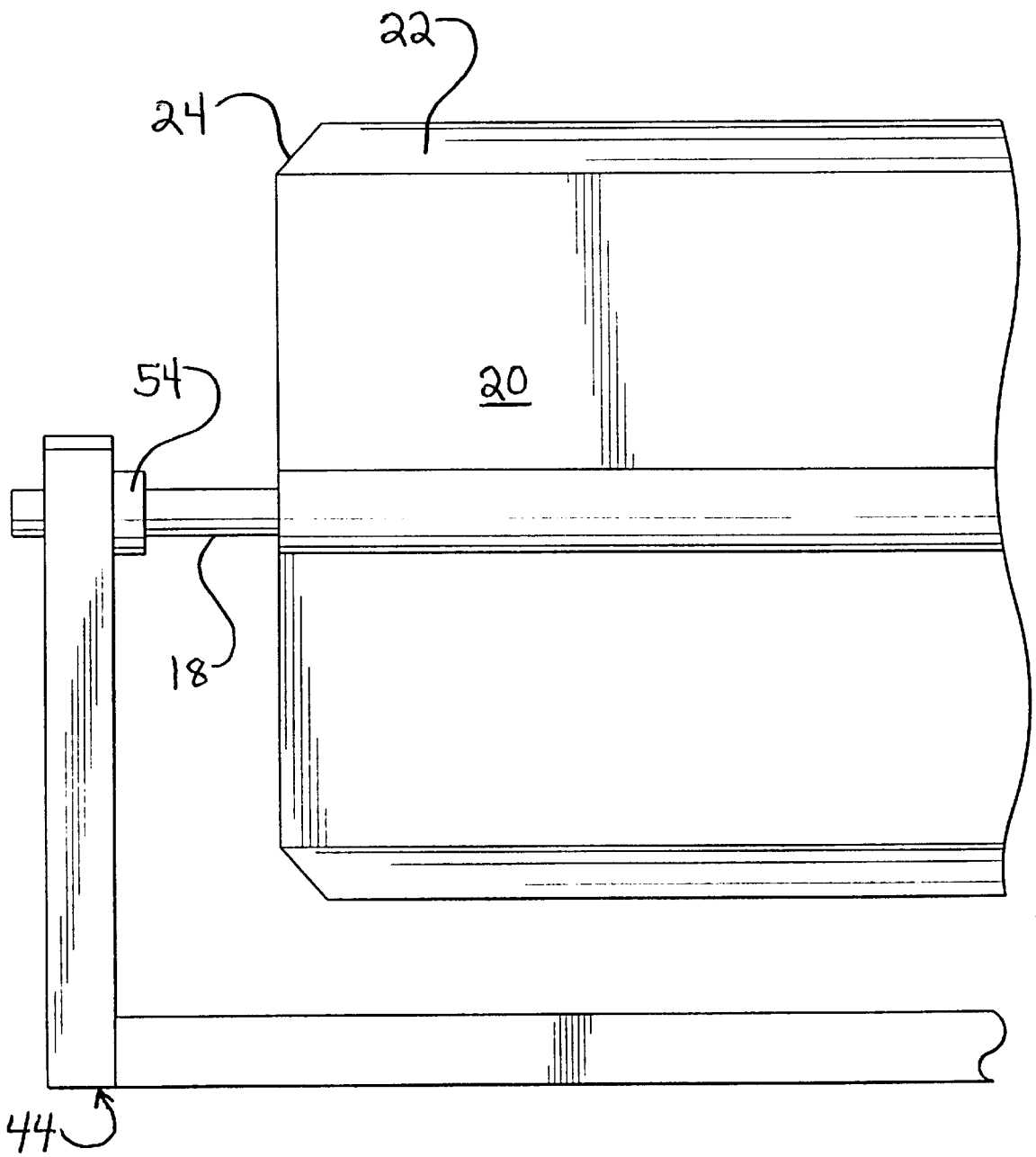
FIG. 3 is a front view of a pair of plates at one end of the shaft.
Figure 4:
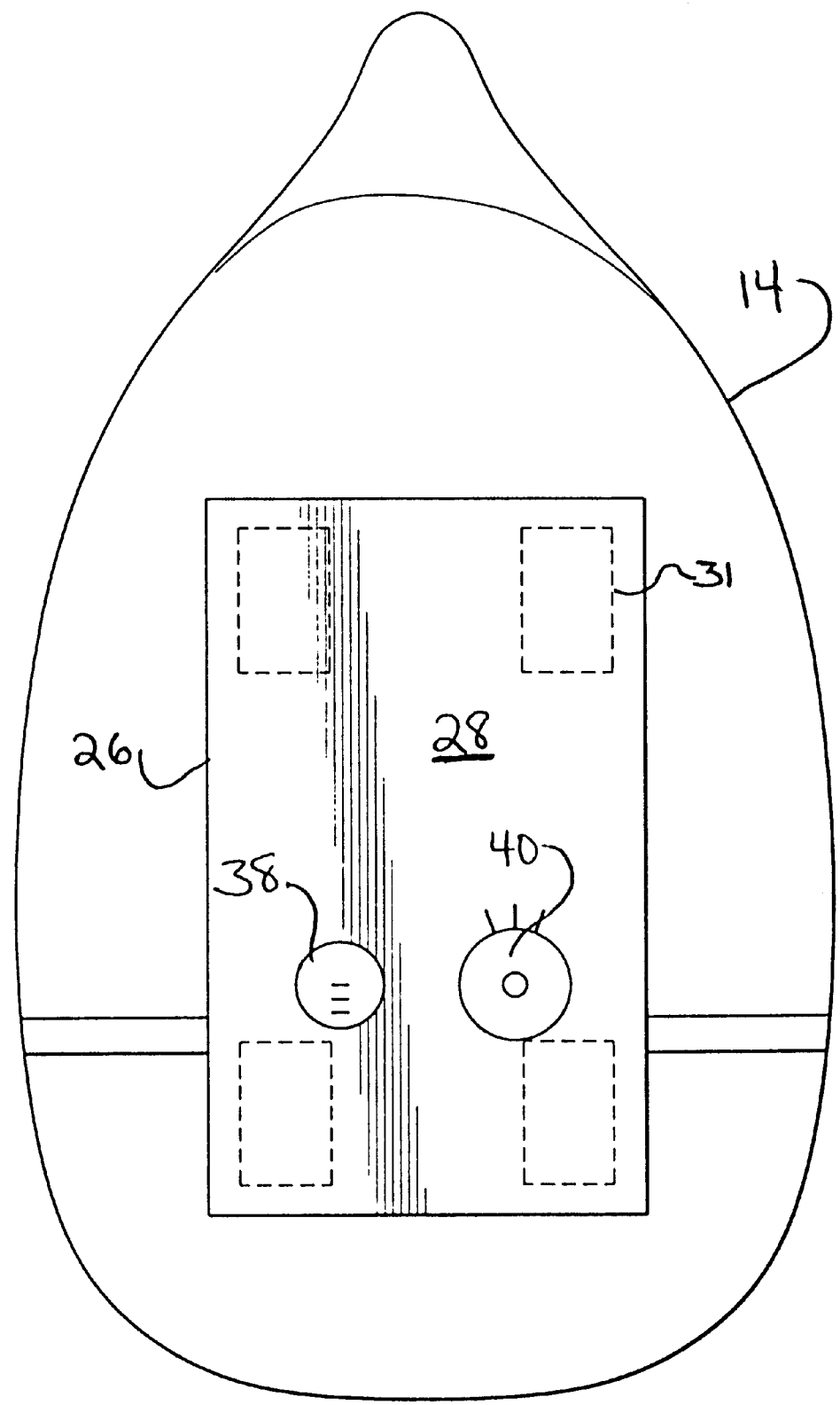
FIG. 4 is a outside view of the control platform, showing plate, hidden velcro, and control knobs.
Figure 5:
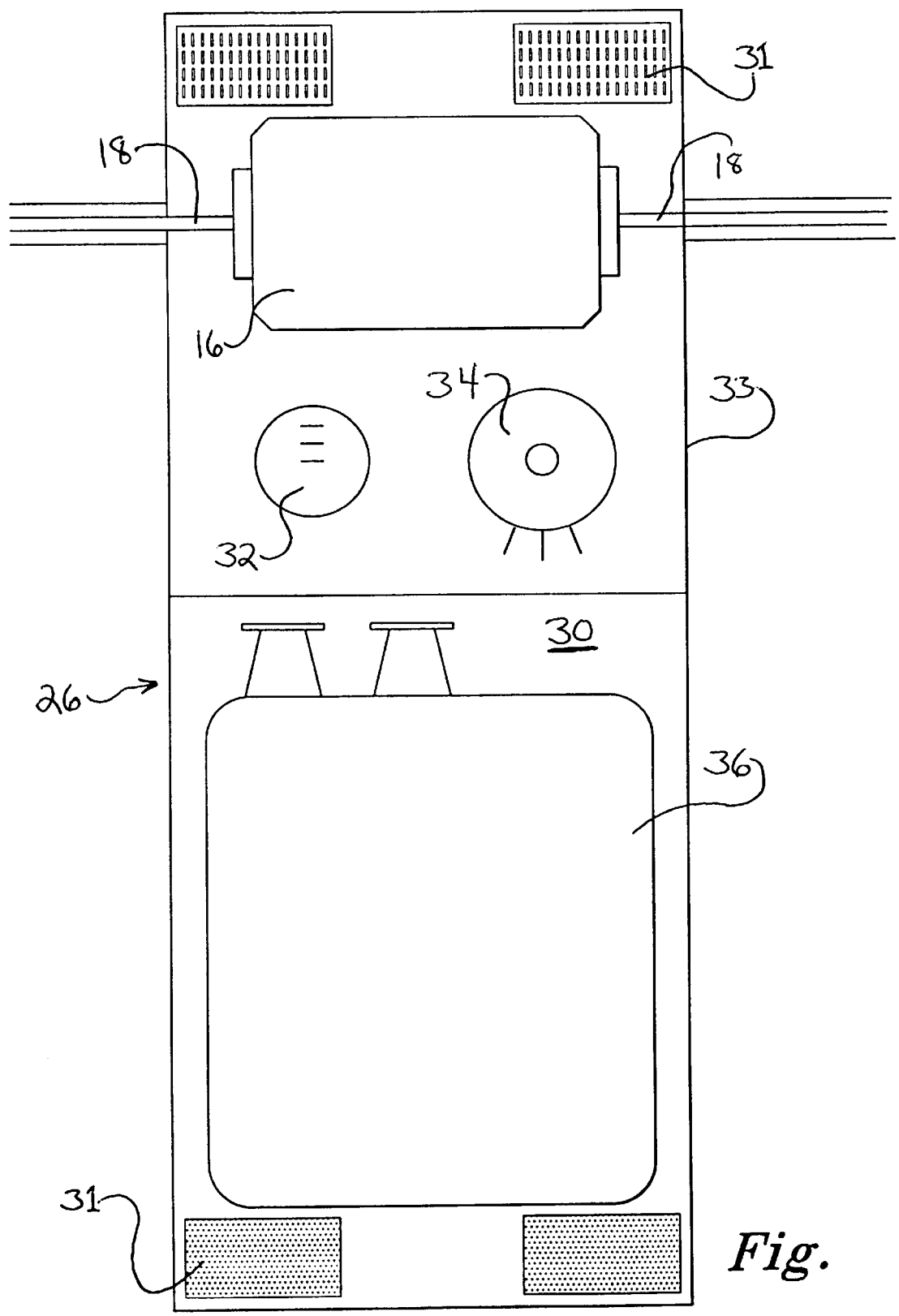
FIG. 5 is an inside view of control platform, bottom of duck, showing motor, power controls, and battery.

FIGS. 1 and 3 shows a motor-driven shaft 18, preferably made from a 3/16 inch solid steel rod, protruding from each of two opposite sides of body 14. Shaft 18 defines the axis of rotation of a pair of substantially rectangular plates 20, preferably 22 gauge steel. Plates 20, in rotation, mimic the flapping of a duck's wings. Plates 20 can be constructed by creasing a steel plate along a center line so as to form a channel for receiving, and welding to, a length of shaft 18. Plates 20 are fixed to each end of shaft 18. Each of plates 20 has a crimped outer edge, furthest from shaft 18, defining an aerodynamic wing flap 22. Shaft 18 is free-spinning and wind actuated when motor 16 is turned off. Wing flap 22 has two dog-ears 24, as a safety feature, so as to minimize sharp edges, and to reduce the severity of any accidental scrape with flap 22. Each of pair 20 is colored with dark brown on one side, and white on an opposite side so as to simulate the flashing of a duck's wings as each of pair 20 spins about the axis. Motor 16 is preferably of variable speed, direct current, and preferably powered by a six volt lantern battery. Motor 16 may also be powered by a 12 volt rechargeable battery.

As shown in FIGS. 2, 4, 5, and 6, a rigid, rectangular-shaped control platform 26, upon which decoy body 14 hand-detachably sits, has an outside surface 28 facing away from body 14, and an inside surface 30 facing body 14.

Inside surface 30 of platform 26 comprises: (a) hook and loop fastener 31 for attachment of platform 26 to body 14, (b) a sub-housing 33 containing motor 16, a switch 32, a rheostat 34, and (c) a battery 36.

Outside surface 28 of platform 26 comprises: (a) an on/off switch knob 38, (b) a rheostat knob 40, (c) a solid, steel, rod-shaped leg 42 that extends generally normal to platform 26 for insertion into frame 44, and (d) an angled brace 46 proximate said leg for optimal bracing of platform 26. Leg 42 is preferably a solid, round stock rod snugly insertable into the square tubing of frame 44.

Figure 6:
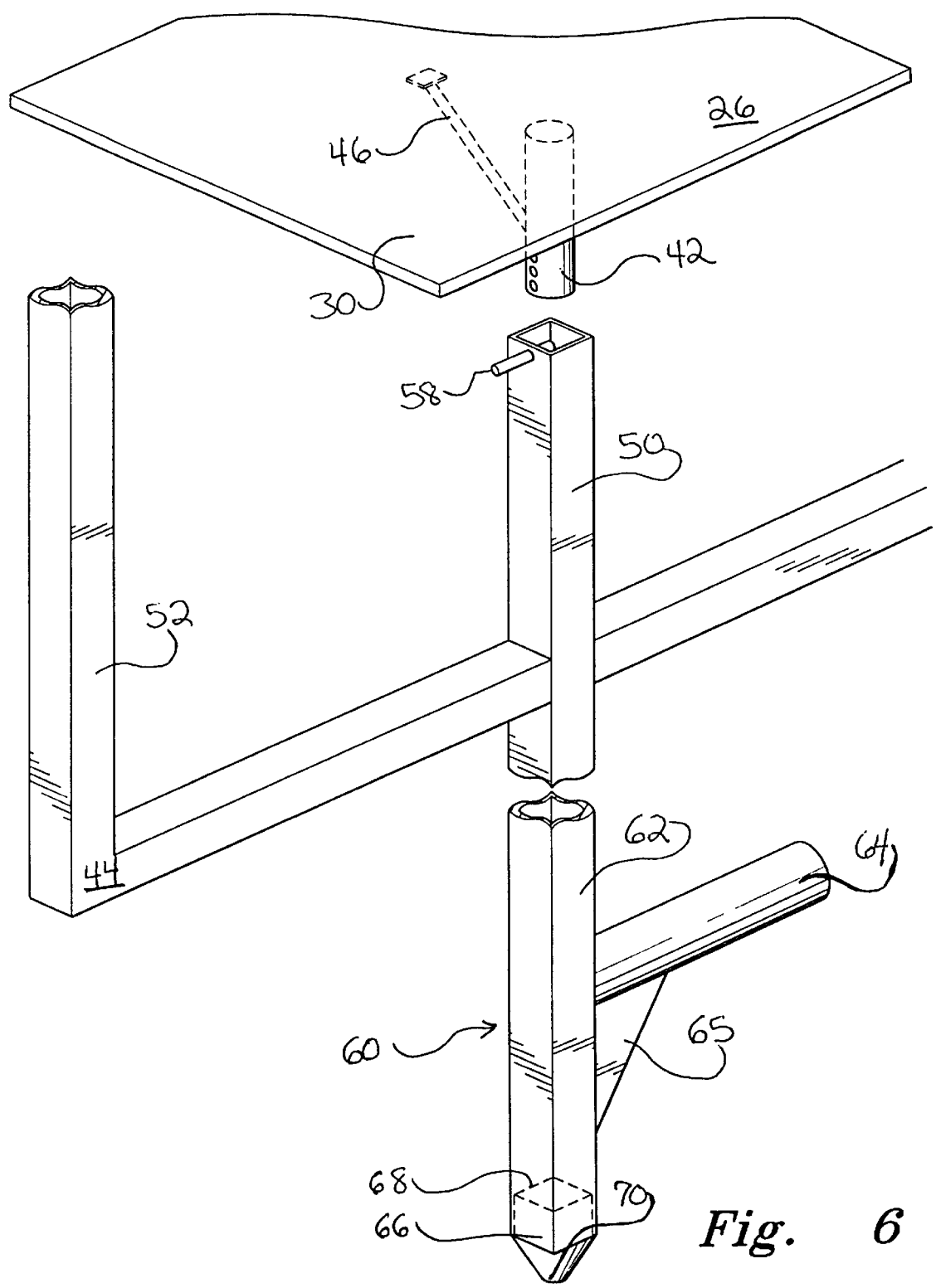
FIG. 6 is a perspective view of the platform, frame, and stand.

Shown in FIGS. 1, 3, and 6, is a frame 44, shaped like a goal post, or a pitch fork. Frame 44 supports platform 26, shaft 18, and wing plates 20. Frame 44 is made from hollow square tubing in order to maximize strength and moment of inertia, and to minimize weight. Preferably, the tubing of frame 44 is made from ½" wide by 1/16" thick steel walls. Frame 44 further comprises a middle fork 50 that supports, and is capable of rotating relative to, platform 26. Frame 44 also has two outside forks 52, each of forks 52 having an associated bushing 54. Bushing 54, attached to an inside area on an upper-most portion of outside forks 52, supports and enables rotation of shaft 18 relative to forks 52. Bushing 54 is preferably made from a durable plastic to minimize noise.

As best shown in FIG. 6, an anti-rotation pin 58 is receivable through an upper end of middle fork 50 and into a mating hole in a side of leg 42, wherein pin 58 serves to prevent rotational movement between platform 26 and frame 44.

FIGS. 1 and 6 show a substantially vertical stand 60 to support frame 44. Stand 60, shaped similar to a pogo stick, comprises a post 62 made of hollow steel tubing, preferably ½ inch by 1/16 inch square tubing, a solid steel, rod-shaped foot peg 64 extending from post 62, and a sharpened stake 66. Peg 64, braced by gusset 65, is capable of supporting more than the weight of an average human. Stake 66, preferably made from round stock steel rod, has a top end 68 insertable into post 62, and a bottom end 70 sharpened or ground so as to be hand-forcibly receivable within the ground. Stake 66, once inside the square tubing of stand 60, is preferably welded to post 62.

By applying foot pressure to foot peg 64, stake 66 of stand 60 is driven into the mud to support the fowl decoy device. Switch knob 38 protruding from platform 26, is then turned to its on position, and rheostat knob 40 is speed adjusted such that the duck decoy flies conspicuously, above the water surface. This fowl decoy maintains the appearance of a duck in perpetual stationary flight above a water body.

It is to be understood that the present invention is not limited to the embodiments described above, but encompasses any and all embodiments within the scope of the following claims.

We claim:

1. A decoy device, comprising:
    a rigid fowl-shaped decoy body housing a motor and power source;
    a motor-driven rotating shaft protruding from each of two opposite sides of said body;
    a pair of substantially rectangular, coplanar plates immovably fixed to said shaft, proximate each of two opposite ends of said shaft, each of said plates having a shaft edge and an outer edge;
    a rigid, flat platform upon which said decoy body hand-detachably sits, said platform having an outside surface facing away from said body, and an inside surface facing said body, said inside surface comprising: (a) a said body to said platform attachment means (b) a sub-housing containing said motor and power controls, and (c) said power source, said outside surface comprising: control knobs and a support member.

a structural frame to support said platform and to support opposite ends of said shaft;

a substantially vertical stand to support said frame, said stand comprising:

a post made of hollow steel tubing;

a solid steel foot peg extending from, and substantially normal to, said post;

a solid steel stake having a top end insertable into said post, and a bottom end sharpened at its tip.

2. A fowl decoy according to claim 1, wherein said motor is variable speed.

3. A fowl decoy according to claim 1, wherein said shaft is free-spinning and wind actuated when said motor is turned off.

4. A fowl decoy according to claim 1, wherein said outer edge is crimped to form a wind flap.

5. A fowl decoy according to claim 4, wherein said wind flap has two dog-eared ends, as a safety feature.

6. A fowl decoy according to claim 1, wherein each of said pair of said plates is colored with dark brown on one surface, and colored white on an opposite surface.

7. A fowl decoy according to claim 1, wherein (a) said attachment means is hook and loop strips, (b) said sub-housing contains a motor, a switch, and a rheostat, and (c) said power source is a 6 volt or 12 volt rechargeable battery.

8. A fowl decoy according to claim 7, wherein said outside surface of said platform further comprises: (a) an on/off switch knob, (b) a rheostat knob, (c) a solid steel, rod-shaped leg extending generally normal to said platform, for insertion into a frame, and (d) an angled brace proximate to said leg.

9. A fowl decoy according to claim 1, wherein said frame is made from hollow steel square tubing.

10. A fowl decoy according to claim 1, wherein said frame comprises a handle, two outside forks, and a middle fork, wherein said middle fork supports and is capable of rotating relative to said platform, and wherein each of said two outside forks has a bushing that supports and enables rotation of said shaft relative to said forks.

11. The device according to claim 1, wherein said foot peg and said stake are rod-shaped.

12. A fowl decoy, comprising:

a rigid fowl-shaped body, housing a variable speed motor;

a motor-driven, rotating shaft protruding from each of two opposite sides of said body;

a pair of substantially rectangular, coplanar plates immovably fixed to said shaft proximate each end of said shaft, each of said plates having a shaft edge and a crimped outer edge defining a wind flap, said wind flap having two dog-eared ends, each of said pair colored with dark brown on one side, and white on an opposite side;

a rigid platform upon which said decoy body hand-detachably sits, said platform having an outside surface facing away from said body, and an inside surface facing said body, said inside surface comprising: (a) hook and loop padding for attachment of said platform to said body, (b) a sub-housing containing said motor, a switch, and a rheostat, and (c) a battery; said outside surface comprising: (a) an on/off switch knob, (b) a rheostat knob, (c) a steel leg extending from and substantially normal to said platform;

a frame made from hollow steel square tubing, comprising:

a middle fork that supports and is capable of rotating relative to said platform;

two outside forks that support said shaft;

a bushing, attached to an inside surface on an uppermost portion of each of said two outside forks;

a pin receivable through an upper end of said middle fork and into a mating hole in a side of said steel leg of said platform, wherein said pin serves to prevent rotational movement between said platfom and said frame;

a stand to support said frame, said stand comprising:

a post made of hollow steel tubing;

a rod-shaped foot peg extending from said post; and a solid, rod-shaped stake having a top end insertable into said post, and a sharpened bottom end readily receivable within the ground.

* * * * *